(12) United States Patent
Shim et al.

(10) Patent No.: US 12,334,619 B2
(45) Date of Patent: Jun. 17, 2025

(54) FLEXIBLE SURFACE WAVE GENERATOR APPLICABLE TO CURVED SURFACES, AND SYSTEM AND METHOD FOR SURFACE WAVE COMMUNICATION USING SAME

(71) Applicants: Korea Institute of Ocean Science & Technology, Busan (KR); Sunny Wave Tech Co., Ltd., Ulsan (KR)

(72) Inventors: Woo Seong Shim, Daejeon (KR); Bu Young Kim, Daejeon (KR); Jin Woo Kong, Incheon (KR)

(73) Assignees: Korea Institute of Ocean Science & Technology, Busan (KR); Sunny Wave Tech Co., Ltd., Ulsan (KR)

( * ) Notice: Subject to any disclaimer, the term of this patent is extended or adjusted under 35 U.S.C. 154(b) by 71 days.

(21) Appl. No.: 18/488,329

(22) Filed: Oct. 17, 2023

(65) Prior Publication Data

US 2024/0136695 A1 Apr. 25, 2024
US 2024/0234998 A9 Jul. 11, 2024

(30) Foreign Application Priority Data

Oct. 25, 2022 (KR) .................. 10-2022-0138499
Aug. 29, 2023 (KR) .................. 10-2023-0113908

(51) Int. Cl.
*H04B 3/00* (2006.01)
*H01P 3/16* (2006.01)
*H04B 3/52* (2006.01)

(52) U.S. Cl.
CPC ........ *H01P 3/16* (2013.01); *H04B 3/52* (2013.01)

(58) Field of Classification Search
CPC .................................... H01P 3/16; H04B 3/52
USPC .................. 375/257, 219, 295, 316
See application file for complete search history.

(56) References Cited

U.S. PATENT DOCUMENTS

| | | | |
|---|---|---|---|
| 2021/0013928 A1* | 1/2021 | Nanni | H04B 3/48 |
| 2021/0175926 A1* | 6/2021 | Henry | H01P 5/103 |
| 2022/0045880 A1* | 2/2022 | Henry | H04B 15/00 |
| 2022/0302957 A1* | 9/2022 | Bennett | H04W 4/21 |

FOREIGN PATENT DOCUMENTS

KR 102565230 B1 8/2023

* cited by examiner

*Primary Examiner* — Zewdu A Kassa
(74) *Attorney, Agent, or Firm* — Harness, Dickey & Pierce, P.L.C.

(57) ABSTRACT

In order to solve the problems of a conventional flat surface wave generator which has limitations on being applied to a curved structure due to more than a certain required thickness of a dielectric material, proposed are a flexible surface wave generator and system and method for surface wave communication using the same where the flexible surface wave generator is bendable by removing a third dielectric material and by making a first and a second dielectric material thin and at the same time reaches communication performance applicable to the ISM band by changing a pattern of a surface wave generation member and by forming a slit in a radiator material, so it is possible to easily establish a surface wave communication system even in environments where a conventional flat surface wave generator is difficult to be applied by being tightly attached to the surface of a metal medium with curvature.

8 Claims, 14 Drawing Sheets

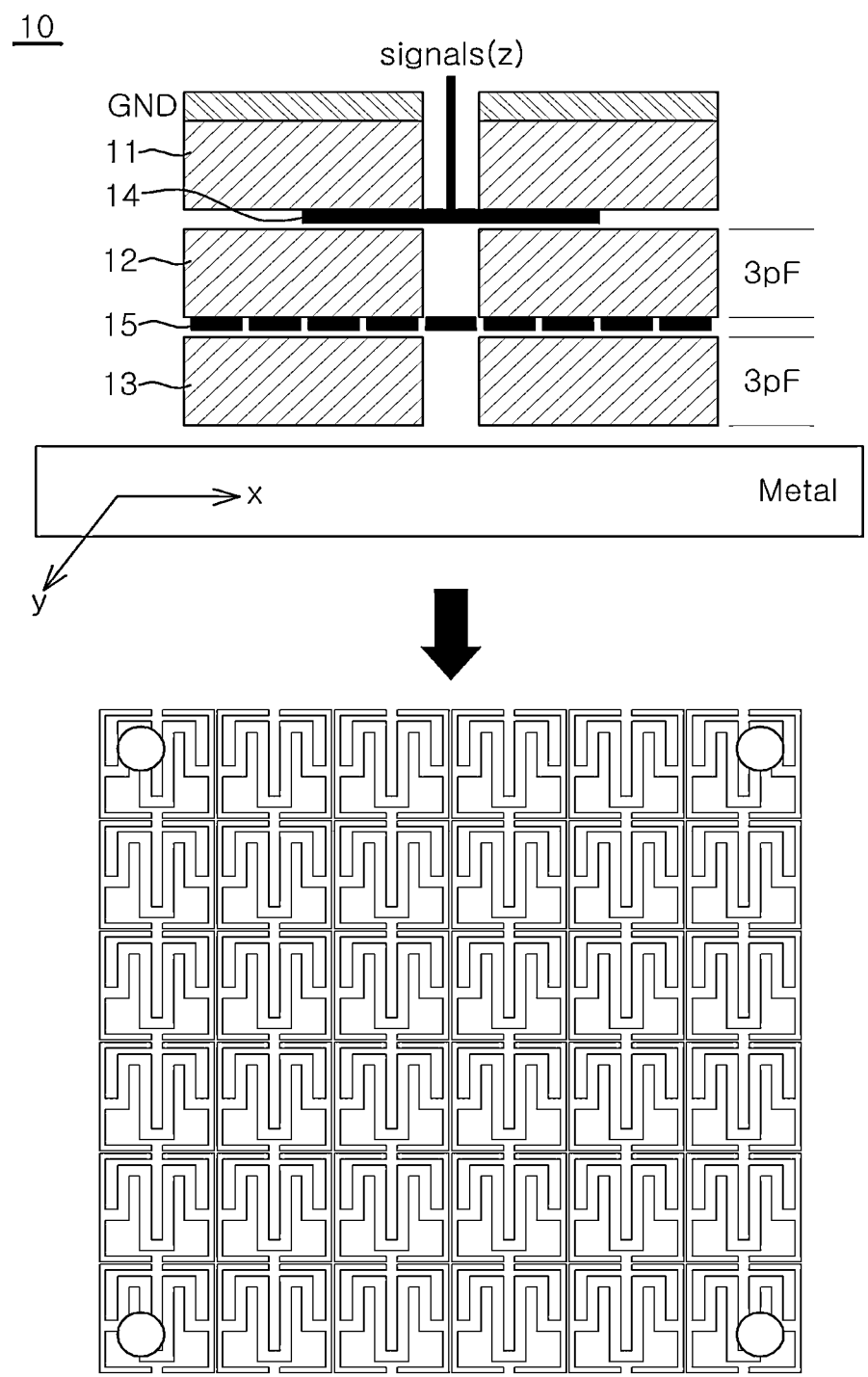
[Figure 1]

[Figure 2]
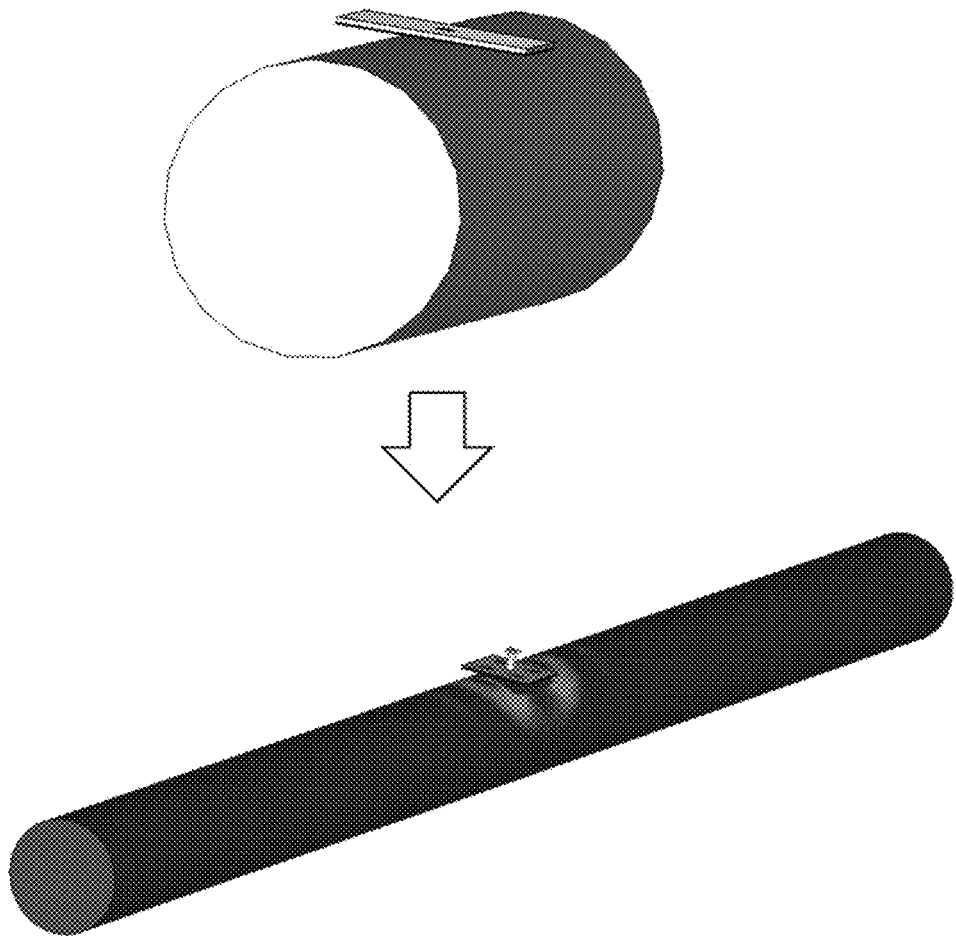

[Figure 3]
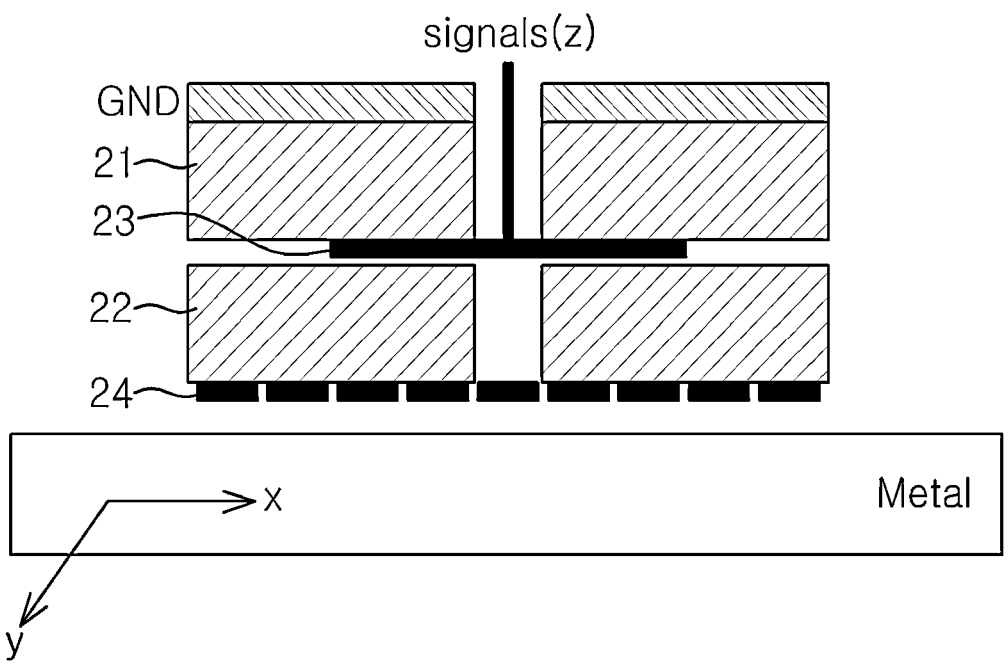

[Figure 4]
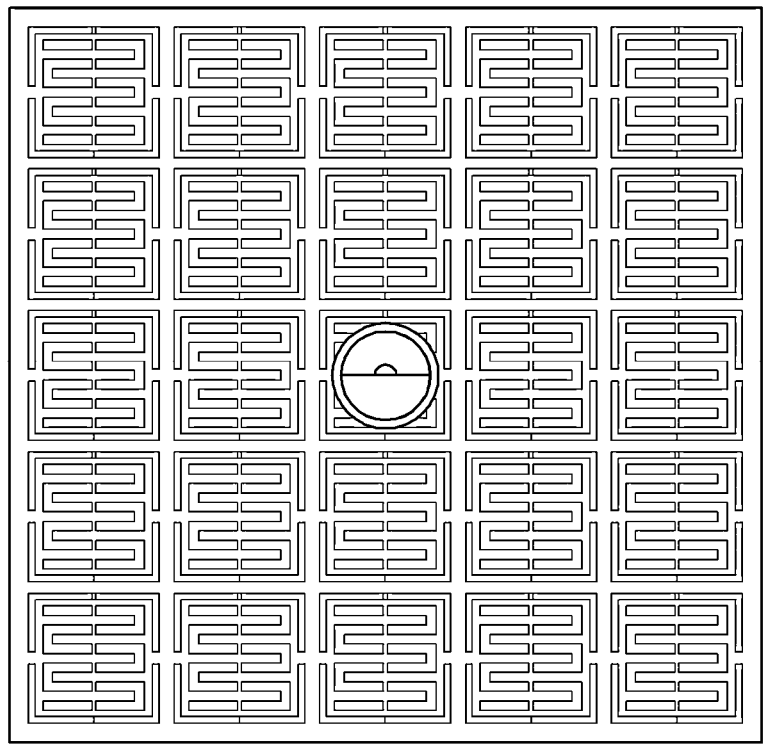
Case1　　　　　　　Case2
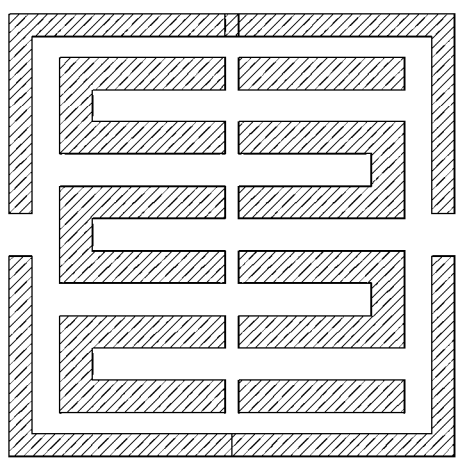 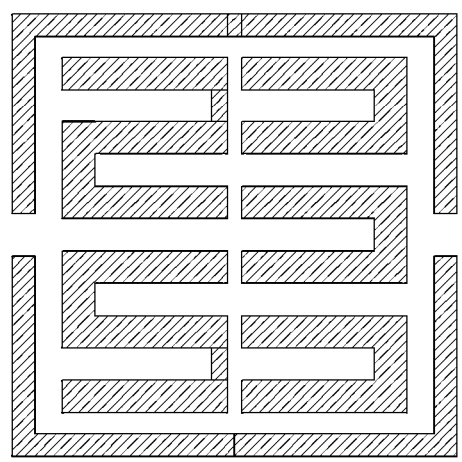

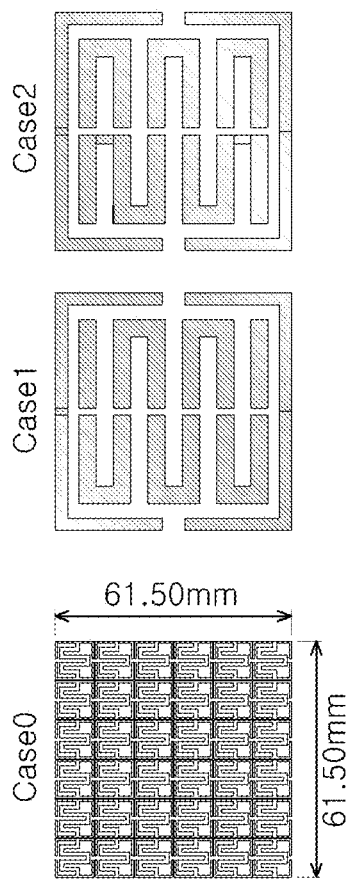
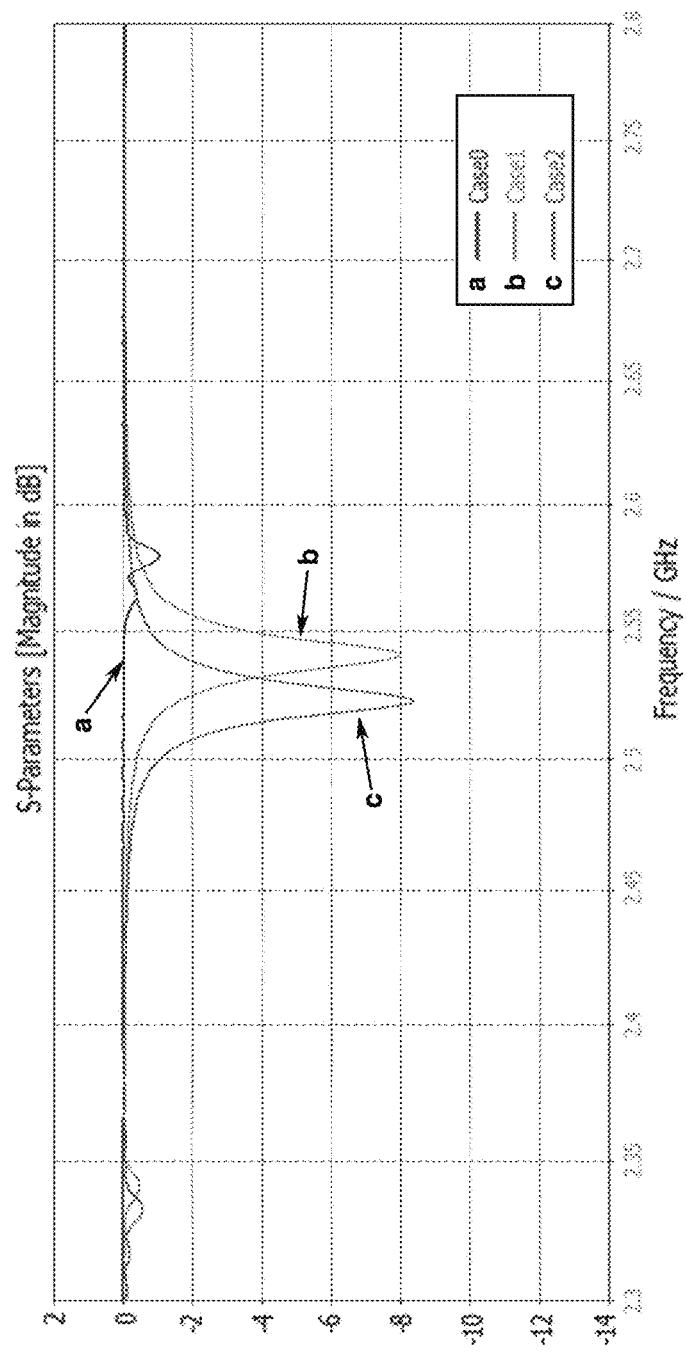
[Figure 5]

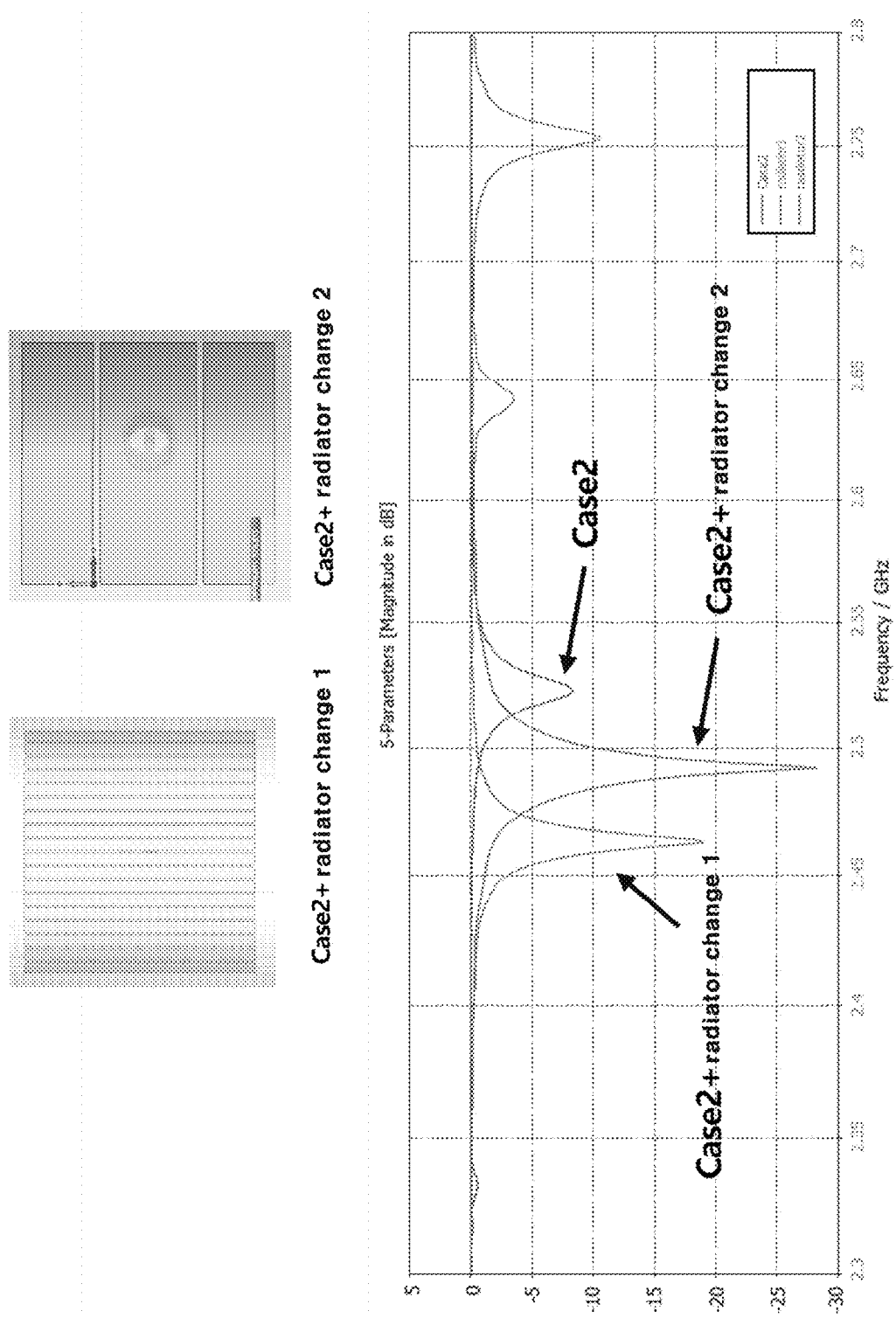
[Figure 6]

[Figure 7]
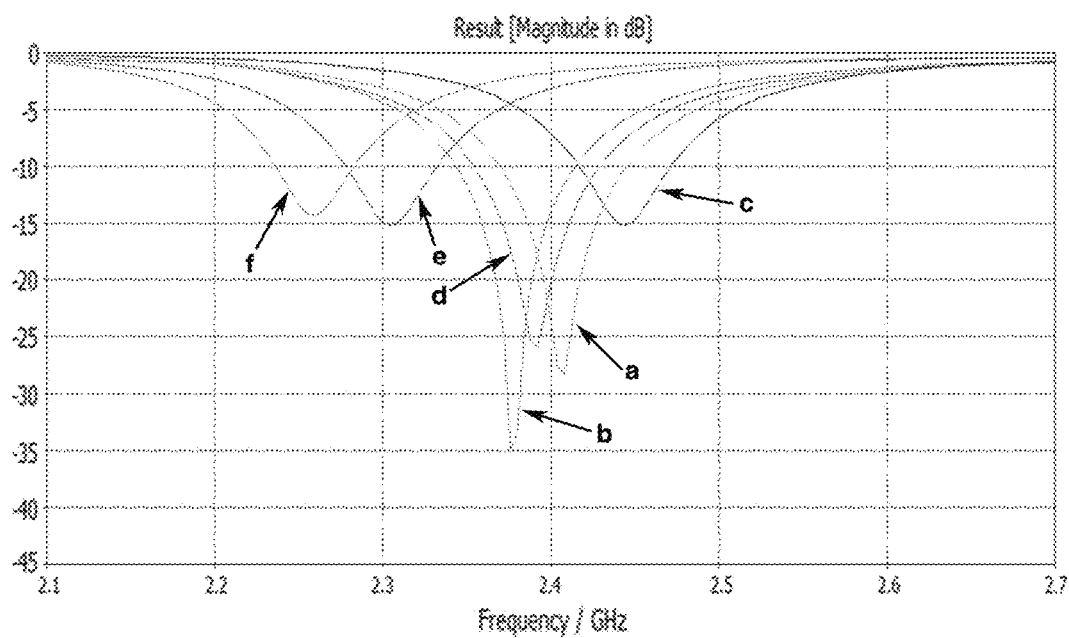

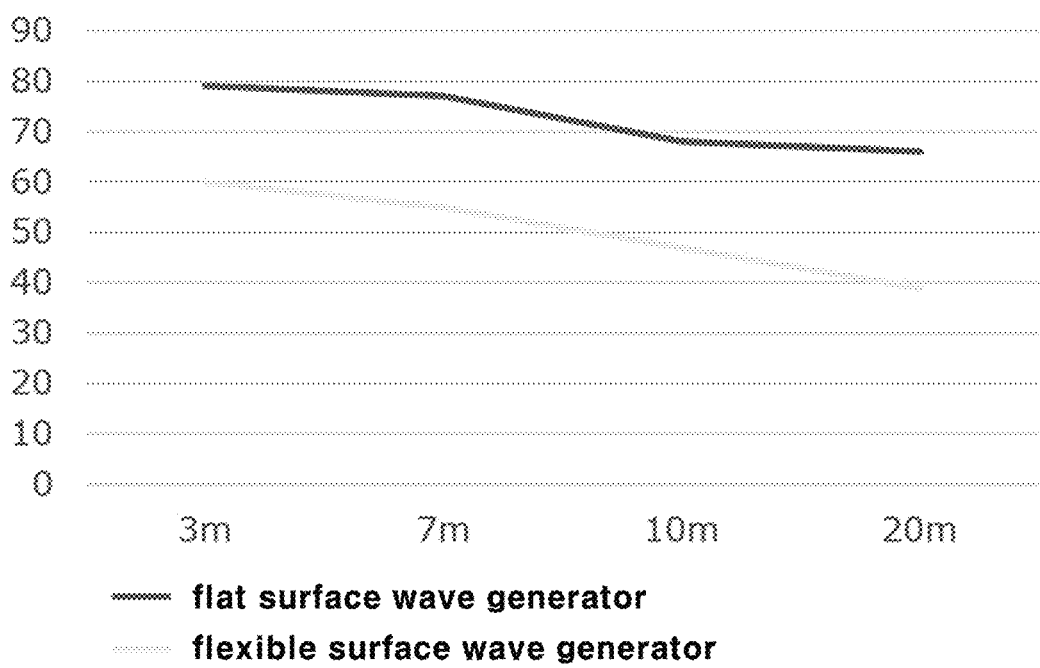
【Figure 8】

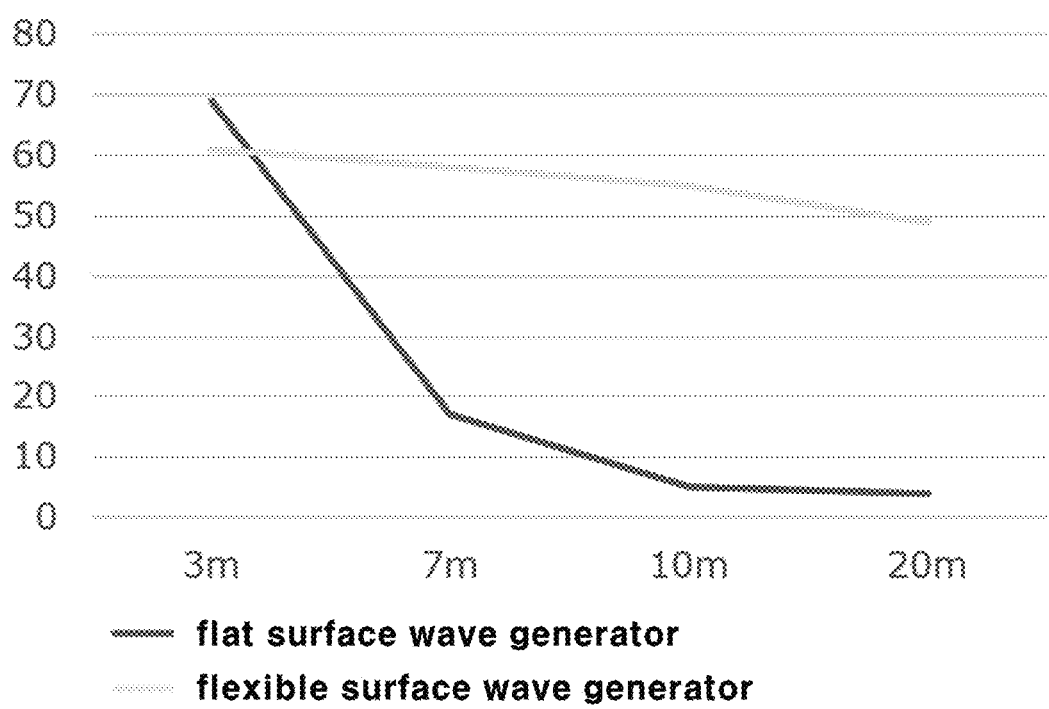

【Figure 10】
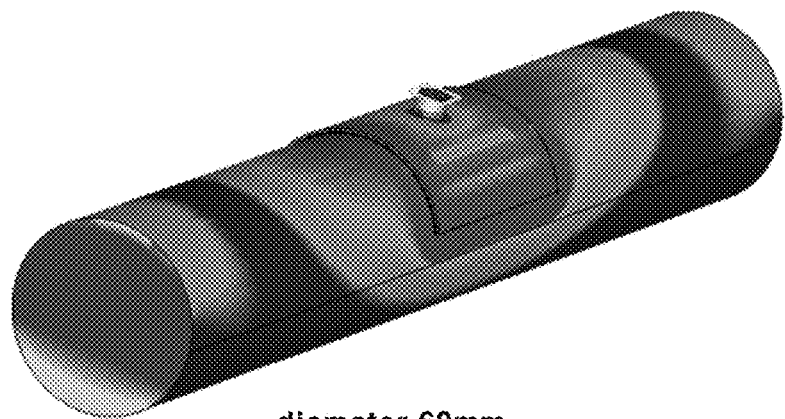
diameter 60mm
diameter 90mm
diameter 150mm

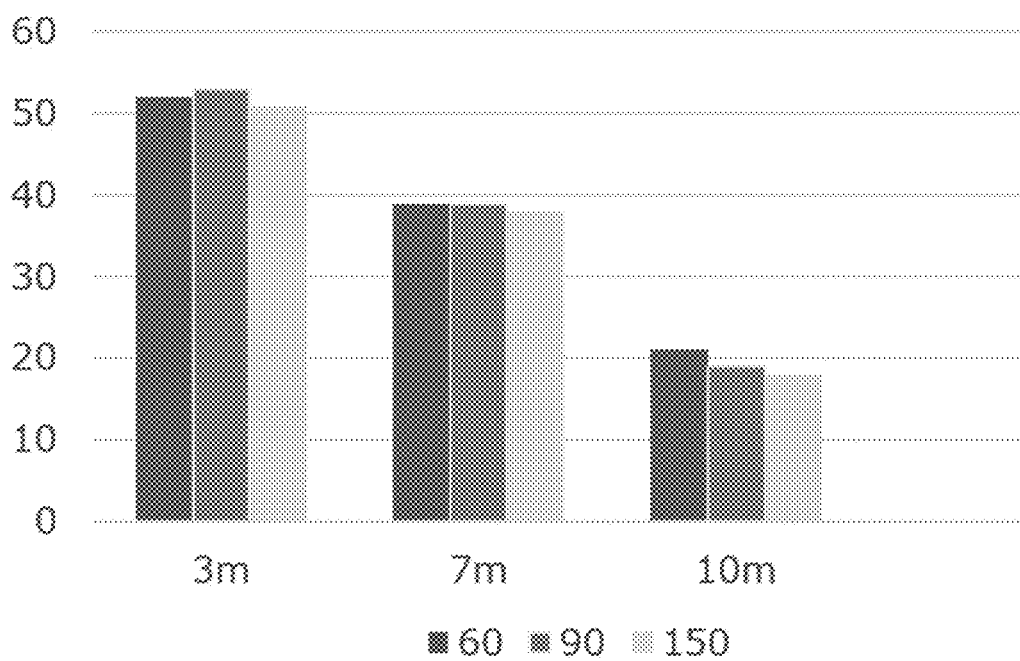
[Figure 11]

【Figure 12】
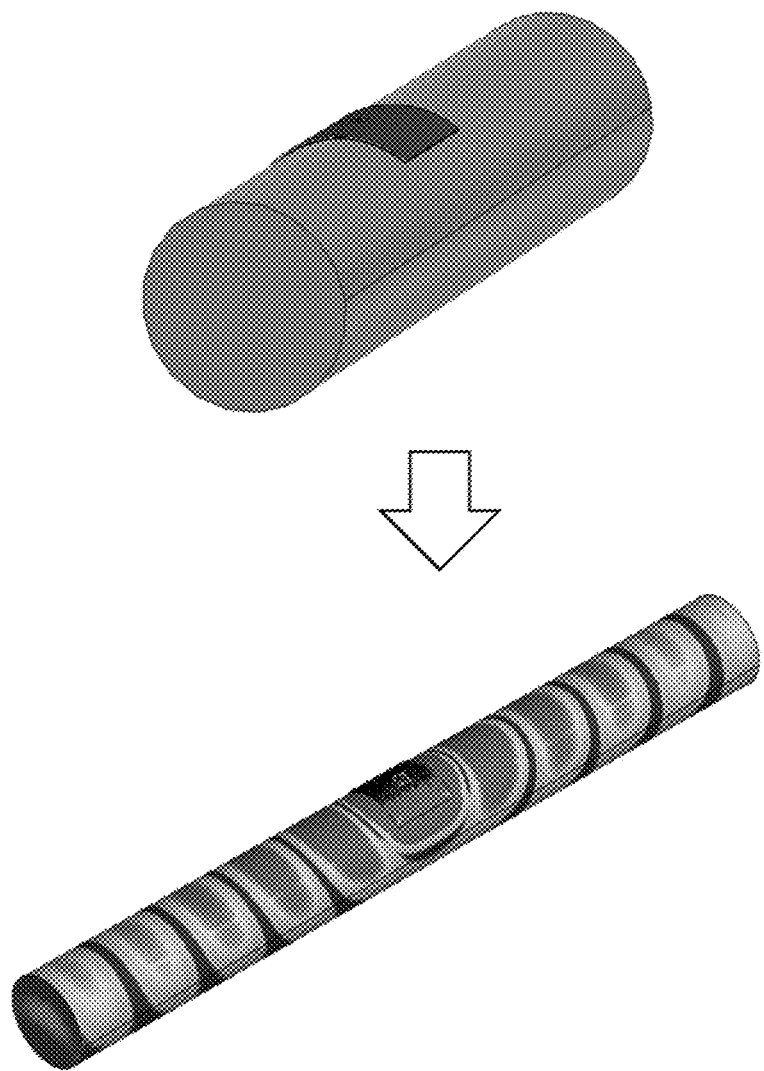

【Figure 13】
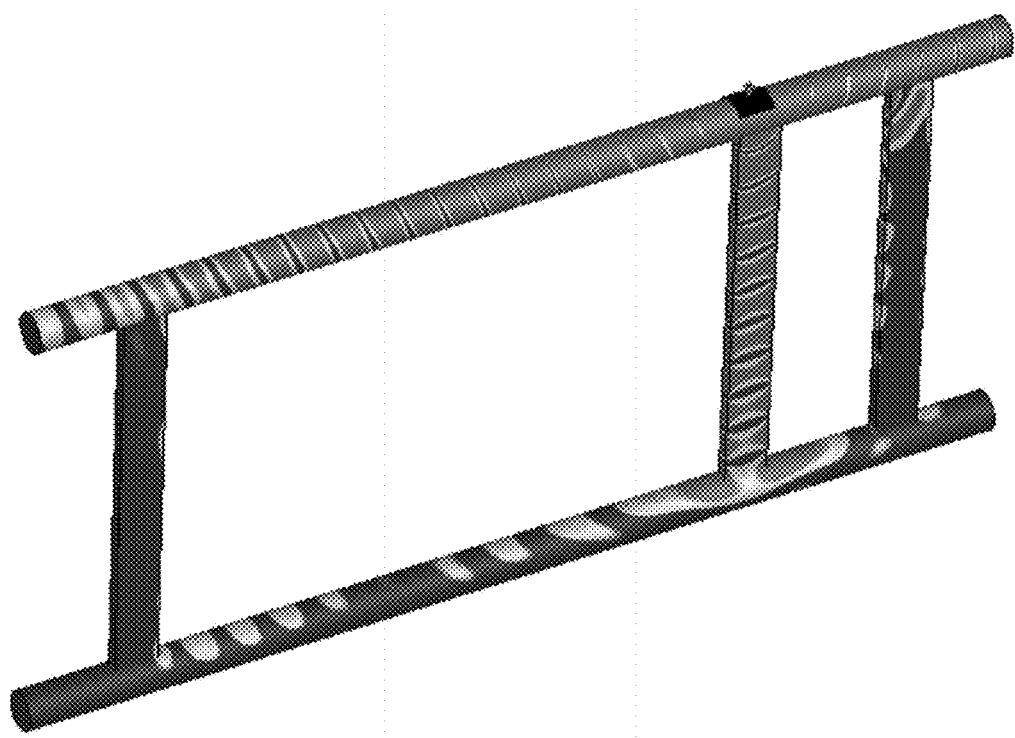

【Figure 14】
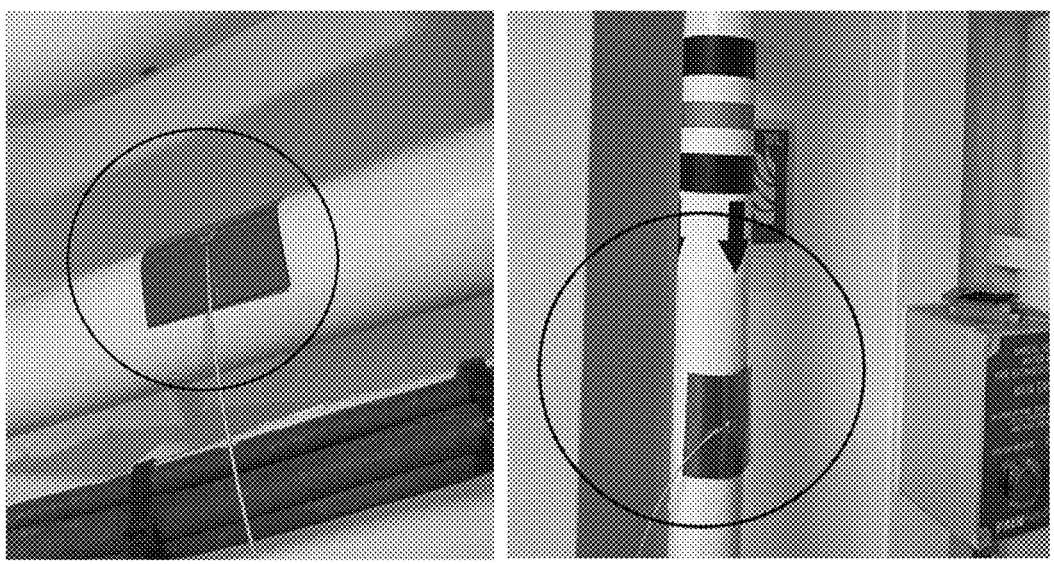

FLEXIBLE SURFACE WAVE GENERATOR APPLICABLE TO CURVED SURFACES, AND SYSTEM AND METHOD FOR SURFACE WAVE COMMUNICATION USING SAME

CROSS REFERENCE TO RELATED APPLICATION

The present application claims priority to Korean Patent Application No. 10-2022-0138499, filed Oct. 25, 2022, and Korean Patent Application No. 10-2023-0113908, filed Aug. 29, 2023, the entire contents of which is incorporated herein for all purposes by this reference.

BACKGROUND

Technical Field

The present disclosure relates to a surface wave generator, and system and method for surface wave communication using the same and, more specifically, to a flexible surface wave generator that enables surface wave communication by being tightly attached to a surface of a transmission medium with curvature or a curved surface, system and method for surface wave communication using the same in order to solve problems of conventional flat surface wave generators and methods that have difficulties and limitations on being applied to a curved surface structure other than a flat surface because of mostly forming a flat structure which is not bendable due to having more than a certain thickness of a physical dielectric material necessarily required along with a specific geometric pattern so as to secure the desired transmission performance.

In addition, in order to enable surface wave communication by being tightly attached to a surface of a transmission medium with curvature or a curved surface as described above, the present disclosure relates to a flexible surface wave generator, and system and method for surface wave communication using the same, wherein the flexible surface wave generator is capable of being bendable by removing a third dielectric material as well as by making a first dielectric material and a second dielectric material thin in a structure of a conventional flat surface wave generator, and at the same time is configured to reach communication performance applicable to the ISM (Industrial Scientific Medical) band by changing a pattern of a surface wave generation member and by forming a slit in a radiator body so that it is possible to transmit signals equally or similarly like a conventional flat surface wave generator even when being attached to a surface of a transmission medium with curvature, such as a cylindrical pipe or the like installed in a ship, and thereby it is possible to easily establish a surface wave communication system with a simple configuration and a lower cost even in environments where a conventional flat surface wave generator is difficult to be applied.

Description of the Related Art

In general, when light or radio waves may be reflected from an arbitrary transmission medium, electric and magnetic fields may be caused by electromagnetic radiation over a certain area at the boundary, and this electromagnetic radiation is called surface waves (evanescent waves).

In addition, this electromagnetic radiation has a property that the electric field may rapidly decrease in intensity whereas the magnetic field does not rapidly decrease in intensity when this electromagnetic radiation travels along the surface of a transmission medium, such as a metal surface.

Accordingly, using the property of such a magnetic field, a conventional surface wave generator is configured to transmit a signal of a magnetic field to a metal surface using an inductive impedance based on a filter characteristic which is generated when a metal is attached to a dielectric material by forming a periodic array of slots for surface wave motions onto a flat-shaped dielectric material.

Thus, a surface wave generator enables communication through a metal surface as described above and several technologies have been suggested as described in, for example, Korean Patent Publication No. 10-2565230, "SURFACE WAVE GENERATOR FOR TRANSMITTING A SURFACE WAVE SIGNAL WHILE ATTACHED TO A METAL SURFACE" in order to enable wireless communication by transmitting radio waves through a metal surface even in a shielded environment, such as a vacuum chamber, the inside of a container, an oil pipeline, and the like where wireless communication is not possible, but the above-mentioned conventional surface wave generators and surface wave communication systems and methods using the same have the following problems.

That is, generally, in order to secure the desired communication performance when designing a surface wave generator, more than a certain physical thickness of a first, a second, and a third dielectric material is necessarily required along with a specific geometric pattern.

Accordingly, conventional surface wave generators as described above mostly have a flat structure that may not be bendable due to the thickness of dielectric materials, and thereby there is a limitation in that conventional flat surface wave generators may not be applicable to curved structures with curvature or complex spaces, such as the interior of a ship.

Furthermore, there is a problem in that conventional surface wave generators require a metal flat area equal to or greater than a surface wave generator area in order to be attached to a metal and transmit the magnetic field through the metal surface.

More specifically, in general, there may not be many places to attach a conventional surface wave generator, thereby making surface wave communication difficult in the case of a ship's guest room or cabin, which is basically made of metal but has a non-metallic interior.

There may be numerous pipes made of metal, such as ventilation lines, cables, or various pipelines in a general ship's guestroom or cabin, so by using these pipes for surface wave communication, it is possible to efficiently perform surface wave communication in the guestroom or cabin.

However, there is a limitation on applying conventional surface wave generators since conventional surface wave generators with flat structures may not be bendable to be tightly attached to a transmission medium with a radius of curvature such as metal pipes as mentioned above.

In order to overcome such a problem, for example, constructing a thin surface wave generator that may be bendable by removing a part of a dielectric material as well as by thinning the rest may be considered, but in this case, there is a problem in that the communication performance may degrade and it is not possible to reach sufficient communication performance to operate in the ISM (Industrial Scientific Medical) band since the properties of a surface wave resonator deteriorate when a value of a capacitive capacitor decreases due to the decrease in the thickness of a dielectric material.

Therefore, in order to solve the limitations of conventional flat surface wave generators as described above, it may be desirable to present a new configuration of a flexible surface wave generator as well as system and method for surface wave communication using the same, wherein the communication performance does not degrade even on the surface of a metallic medium with curvature and sufficient communication performance is maintained at the same level as before simultaneously having a characteristic of flexibility applicable to a curved surface, but no device or method that satisfies all such needs has been presented so far.

DOCUMENTS OF RELATED ART (Patent Document 1) Korea Patent No. 10-2565230 (Aug. 11, 2023)

SUMMARY

The present disclosure is to solve problems of conventional surface wave generators, and the objective of the present disclosure is to propose a flexible surface wave generator that enables surface wave communication by being tightly attached to the surface of a transmission medium with curvature or a curved surface as well as system and method for surface wave communication using the same in order to solve problems of conventional flat surface wave generators and methods which have difficulties and limitations on being applied to a curved surface structure other than a flat surface because of mostly being famed in a flat structure which is not bendable due to having more than a certain thickness of a physical dielectric material necessarily required with a geometric pattern so as to secure the desired transmission performance.

In addition, in order to enable surface wave communication by being tightly attached to the surface of a transmission medium with curvature or a curved surface as described above, another objective of the present disclosure is directed to proposing a flexible surface wave generator, and system and method for surface wave communication using the same, wherein the flexible surface wave generator is capable of being bendable by removing a third dielectric material in a structure of a conventional flat surface wave generator as well as by making a first dielectric material and a second dielectric material thin, and at the same time is configured to reach communication performance applicable to the ISM (Industrial Scientific Medical) band by changing a pattern of a surface wave generation member and by forming a slit in a radiator body so that it is possible to transmit signals equally or similarly like a conventional flat surface wave generator even when being attached to the surface of a transmission medium with curvature such as a cylindrical pipe and the like installed in a ship and thereby it is possible to easily establish a surface wave communication system with a simple configuration and a lower cost even in environments where a conventional flat surface wave generator is difficult to be applied.

As described above, in order to achieve the objectives according to the present disclosure, provided is a flexible surface wave generator that includes a first dielectric material that is formed with a predetermined size and thickness using a flexible material, a second dielectric material that is formed with a predetermined size and thickness using a flexible material and is placed below the first dielectric material, a radiator body that is formed with a predetermined size and thickness using a flexible material, that is placed between the first dielectric material and the second dielectric material and that radiates an electromagnetic field when an external signal is received, and a surface wave generator member that is formed not only with a predetermined size and thickness using a flexible material but also with a predetermined pattern in order to transmit a surface wave signal of a predetermined frequency from an electromagnetic field generated by the radiator body and is placed below the second dielectric material, so surface wave communication enables wireless communication even in an environment where a conventional flat surface wave generator is difficult to be applied since surface wave communication is possible even on a curved surface or a structure having a curvature other than a flat surface.

Here, the first dielectric material and the second dielectric material may be characterized in being bendable using a FPC (flexible printed circuit) material.

In addition, the radiator body and the surface wave generation member may be characterized in being bendable using a copper, gold, or silver material.

Alternatively, the radiator body and the surface wave generation member may be characterized in using a bendable dielectric material with a predetermined permittivity.

Also, the surface wave generation member may be configured to include a slot where a unit slot on which a magnetic material with a geometric pattern of a predetermined shape may be deposited may be periodically arranged in order to generate a surface wave through the occurrence of resonance in a predetermined frequency band including the ISM (Industrial Scientific Medical) band.

Moreover, the radiator body may be configured to include slits formed with predetermined numbers and intervals.

In addition, according to the present disclosure, provided is a surface wave communication system configured to include the flexible surface wave generator.

Also, according to the present disclosure, provided is a surface wave communication method configured to include an installation step that performs the process of installing a surface wave generator at a predetermined location for surface wave communications and a communication step that performs the process of sending and receiving a surface wave signal using each surface wave generator installed at the installation step and the surface wave generator may be configured to use the flexible surface wave generator.

As described above, according to the present disclosure, by providing a flexible surface wave generator and system and method for surface wave communication using the same where the flexible surface wave generator may be configured to be bendable by removing a third dielectric material as well as by making a first dielectric material and a second dielectric material thin in a structure of a conventional flat surface wave generator, and at the same time where the flexible surface wave generator may be configured to reach communication performance applicable to the ISM (Industrial Scientific Medical) band by changing a pattern of a surface wave generation member and by forming a slit in a radiator body, it may be possible to transmit signals equally or similarly like a conventional flat surface wave generator even when being attached to the surface of a transmission medium with curvature such as a cylindrical pipe and the like installed in a ship and thereby it may be possible to easily establish a surface wave communication system with a simpler configuration and a lower cost even in environments where a conventional flat surface wave generator may be difficult to be applied.

In addition, according to the present disclosure, by providing a flexible surface wave generator configured to enable surface wave communication by being closely attached to the surface of a transmission medium having curvature or a curved surface as well as system and method for surface wave communication using the same as described above, it may be possible to solve problems of conventional flat surface wave generators and methods that have difficulties and limitations on being applied to a curved surface structure other than a flat surface because of mostly forming a flat structure which may not be bendable due to having more than a certain thickness of a physical dielectric material necessarily required along with a geometric pattern so as to secure the desired transmission performance.

BRIEF DESCRIPTION OF THE DRAWINGS

FIG. 1 is a conceptual diagram schematically showing the overall configuration of a conventional flat surface wave generator.

FIG. 2 is a conceptual diagram schematically showing the performance degradation that occurs when a conventional flat surface wave generator is applied to a curved surface.

FIG. 3 is a view schematically showing an overall configuration of a flexible surface wave generator according to an exemplary embodiment of the present disclosure.

FIG. 4 is a view schematically showing an exemplary configuration of a unit slot formed in a surface wave generation member of a flexible surface wave generator according to an exemplary embodiment of the present disclosure.

FIG. 5 is a graph showing the results of respectively measuring the variation of a S-parameter depending on frequency about a conventional surface wave generation member (Case 0) and the surface wave generation member (Case 1, Case 2) shown in FIG. 4.

FIG. 6 is a graph showing the results of respectively measuring the variation of the S-parameter depending on frequency by forming a slit in a radiator body of a surface wave generator.

FIG. 7 is a graph showing the results of respectively measuring the variation of the S-parameter depending on a configuration variation of a slit formed in a radiator body of a surface wave generator.

FIG. 8 is a graph showing the results of measuring and comparing a transmission speed in a flat zone for a flexible surface wave generator according to an exemplary embodiment of the present disclosure and a conventional surface wave generator respectively.

FIG. 9 is a graph showing the results of measuring and comparing a transmission speed in a curved zone for a flexible surface wave generator according to an exemplary embodiment of the present disclosure and a conventional surface wave generator respectively.

FIG. 10 is a conceptual diagram schematically showing an exemplary configuration in which a flexible surface wave generator according to an exemplary embodiment of the present disclosure is respectively applied to a curved surface of different diameters and transmits a surface wave signal.

FIG. 11 is a graph showing the results of measuring and comparing the variation of communication performance depending on the degree of bending in each case shown in FIG. 10.

FIG. 12 is a conceptual diagram schematically showing an exemplary configuration in which a surface wave signal may be transmitted through a curved surface using a flexible surface wave generator according to an exemplary embodiment of the present disclosure.

FIG. 13 is a conceptual diagram schematically showing another configuration in which a surface wave signal may be transmitted through a curved surface using a flexible surface wave generator according to an exemplary embodiment of the present disclosure.

FIG. 14 is a view showing that surface wave communication may be performed after installing a flexible surface wave generator according to an exemplary embodiment of the present disclosure in a pipeline of an actual ship.

DETAILED DESCRIPTION OF THE DISCLOSURE

Hereinafter, with reference to the accompanying drawings, specific exemplary embodiments of a flexible surface wave generator applicable to a curved surface and system and method for surface wave communication using the same will be described according to the present disclosure.

Here, it should be noted that the following description may be only one embodiment for practicing the present disclosure and the present disclosure may not be limited to the contents of the exemplary embodiments described below.

In addition, it should be noted that in the following description of exemplary embodiments of the present disclosure, the detailed description may be omitted to simplify the explanation where the contents may be the same or similar to the contents of the related art or where the contents may be judged to be easily understood and implemented at the level of those skilled in the art.

Subsequently, with reference to the drawings, specific details of a flexible surface wave generator applicable to a curved surface and system and method for surface wave communication using the same will be described according to the present disclosure.

More specifically, referring first to FIG. 1, FIG. 1 is a view schematically showing the overall configuration of a conventional flat surface wave generator 10.

As shown in FIG. 1, a conventional surface wave generator may be configured such that a first dielectric material 11, a second dielectric material 12, and a third dielectric material 13 may be stacked respectively, a radiator body (patch) 14 may be placed between the first dielectric material 11 and the second dielectric material 12 to radiate an electromagnetic field when receiving an external signal, and a surface wave generation member 15 formed with a predetermined geometric pattern may be placed between the second dielectric 12 and the third dielectric 13 in order to transmit a surface wave signal through a metal surface by generating resonance for a predetermined frequency from the electromagnetic field generated in the radiator body 14.

Here, in order to be applied to the frequency of the ISM band as shown in FIG. 1, the capacitive impedance values between the first dielectric material 11 and the second dielectric material 12 as well as between the second dielectric material 12 and the third dielectric material 13 should be at least equal to or greater than 3 pF, and the thickness of each dielectric material should be at least equal to or greater than 0.2 mm.

In addition, the above surface wave generation member 15 should be formed with a length of a unit slot to be equal to or greater than a predetermined minimum length of a unit slot for inductive impedance matching so that in the case of a surface wave generator in the 2.4 GHz band, for example, the length of a unit slot should be equal to or greater than 59.4 mm (about λg/2).

In addition, as mentioned above, a conventional surface wave generator 10 may be mostly formed with a flat shape without the property of bending due to the requirement of more than a certain level of a dielectric material thickness, and thereby there may be a limitation that communication performance degrades when being applied to a curved surface other than a flat surface.

More specifically, referring to FIG. 2, FIG. 2 is a conceptual diagram schematically showing the performance degradation that occurs when a conventional flat surface wave generator 10 shown in FIG. 1 may be applied to a curved surface.

As shown in FIG. 2, for example, when being installed on a transmission medium with curvature or a curved surface, such as a metal pipe, a conventional flat surface wave generator 10 may not be fully attached to the surface of a transmission medium since it may not be bendable, so communication performance decreases as the strength of the signal transmitted through the surface decreases as shown on the right side of FIG. 2.

That is, generally a flat area equal to or greater than a surface wave generator may be essentially required in order to enable surface wave communication using a surface wave generator, but as shown in FIG. 1 and FIG. 2 a conventional flat surface wave generator 10 may not be completely attached to a metal surface having a radius of curvature or a cylindrical structure such as a pipe, so there may be a problem that simply increasing the area of a surface wave generator may not obtain sufficient communication performance as desired.

Accordingly, in order to solve problems of conventional flat surface wave generators 10 as described above, the present inventors present a flexible surface wave generator with a new configuration where the flexible surface wave generator with a flexible characteristic may be bendable along a curved surface and at the same time obtains sufficient communication performance suitable for a surface wave communication.

Subsequently, referring to FIG. 3, FIG. 3 is a block diagram schematically showing the overall configuration of a flexible surface wave generator 20 according to an exemplary embodiment of the present disclosure.

As shown in FIG. 3, the flexible surface wave generator 20 according to an exemplary embodiment of the present disclosure may be configured to include a first dielectric material 21 that may be famed with a predetermined size, a second dielectric material 22 that may be formed with a predetermined size and may be placed below the first dielectric 21, a radiator body 23 which may be placed between the first dielectric material 21 and the second dielectric material 22 to radiate an electromagnetic field when receiving an external signal, and a surface wave generation member 24 which may be formed with a predetermined geometric pattern and may be placed below the second dielectric material 22 in order to transmit a surface wave signal through the metal surface by generating resonance for a predetermined specific frequency from the electromagnetic field generated by the radiator body 23.

That is, as shown in FIG. 3, the flexible surface wave generator 20 according to an exemplary embodiment of the present disclosure may be configured similarly to a conventional surface wave generator 10 shown in FIG. 1 in that the first dielectric 21 and the second dielectric 22 may be stacked and a radiator body 23 and a surface wave generation member 24 may be included.

However, the flexible surface wave generator 20 according to an exemplary embodiment of the present disclosure may be different in that the third dielectric material 13 may be removed from a conventional flat surface wave generator 10 shown in FIG. 1, and a specific configuration of a radiator body 23 and a surface wave generation member 24 and the shape of a unit slot may be changed so as to reach communication performance applicable to the ISM band, as described below.

More specifically, first, the first dielectric material 21 and the second dielectric material 22 may be configured to be bendable, for example, using a flexible printed circuit (FPC) material.

In addition, the first dielectric material 21 and the second dielectric material 22 may be manufactured to be a flexible copper clad layer or to be copper cladded for use in a flexible printed circuit board, and in the wiring of electronic components requiring flexibility.

Here, the flexible copper-clad layer has the advantage of being thin and flexible, so a copper-clad layer may be manufactured using a laminating method, a casting method, a sputtering method, and the like, or using a mixture of the three kinds of layer manufacturing methods in order to form a fine circuit line width of the flexible printed circuit board, yet it should be noted that the present disclosure may not be necessarily limited to the contents shown in the exemplary embodiments of the present disclosure, and therefore, the present disclosure may be configured with various modifications and changes as needed by those skilled in the art without departing from the spirit and essence of the present disclosure.

Also, the radiator body 23 and the surface wave generation member 24 may be configured to use for signal transmission, for example, copper, gold, or silver, which may be commonly used and easily bendable, or a flexible dielectric material having a permittivity of 3 to 5.

Moreover, in general, there may be no performance change depending on differences in the thickness of the surface wave generation member 24 so that the thickness of the surface wave generation member 24 may be configured to be selectively applied to the curvature of a transmission medium flexible to an extent to be easily attached to a curved surface, for example, 0.005 mm and the like.

Here, as described above, a surface wave generator may be configured to be bendable by simply removing the existing third dielectric material and by making the first dielectric material 21, the second dielectric material 22, and the surface wave generation member 24 thin using flexible materials, but there may be a problem that such a configuration alone does not result in communication performance enough to be applicable to the ISM band.

More specifically, when the overall thickness may be changed by removing the conventional third dielectric material 13 and by making the first dielectric material 21 and the second dielectric material 22 thin using the FPC material in order to implement a flexible surface wave generator bendable enough to be applicable to the ISM band as shown above, there may be a problem that the value of the capacitive capacitor decreases as the thickness of the first dielectric material 21 and the second dielectric material 22 decreases, thereby resulting in deterioration of the characteristics of the resonator at the desired frequency.

To overcome this problem, according to the present disclosure, it may be configured to implement communication performance more than a certain desired level by changing the pattern length and the arrangement of a unit slot of the surface wave generation member 24.

More specifically, referring to FIG. 4, FIG. 4 is a view schematically showing an exemplary configuration of a unit slot formed in the surface wave generation member 24 of the flexible surface wave generator 20 according to an exemplary embodiment of the present disclosure.

As shown in FIG. 4, the surface wave generation member 24 may be configured to include a slot in which a unit slot with a pattern of a predetermined shape may be periodically arranged in order to transmit a surface wave signal of a predetermined specific frequency, for example, the ISM band (e.g., 2.4 GHz).

That is, for example, as shown in case 1 of FIG. 4, the unit slot may be configured to have a total length of 59.4 mm, form a slit (0.3 mm) inside the unit slot in order to increase an inductive reactance and have five internal patterns of 7.5 mm size (about λg/16) inserted to inside the unit slot.

Alternatively, the unit slot may be configured to have three internal patterns of 7.5 mm size (about λg/16) and two internal patterns of 13.8 mm size (about λg/8) respectively inserted therein as shown in case 2 of FIG. 4 and it should be noted that the present disclosure may be configured in various ways as needed, including configurations other than those shown in the exemplary embodiments.

Therefore, as described above, the surface wave generation member 24 may be configured to include a magnetic material (slot) on which a predetermined geometric pattern may be deposited in order to generate a surface wave by creating resonance in a predetermined specific frequency band.

Here, as a method of depositing a magnetic material with a geometric pattern, PVD (Physical Vapor Deposition), CVD (Chemical Vapor Deposition), ALD (Atomic Layer Deposition) and the like may be applied and PVD process may be performed using, for example, thermal evaporation, E-beam evaporation, or sputtering, and it should be noted that the detailed explanation may be omitted here for the brief explanation since the details of these pattern formation and deposition methods may be obvious to those skilled in the art with reference to the contents of the related arts.

In addition, the area or the geometric pattern of the surface wave generation members 24 may be determined based on the impedance of a transmission medium to which the flexible surface wave generator 20 may be attached, and the arrangement or the quantity of the surface wave generation members 24 may be determined based on the impedance of a transmission medium to which the flexible surface wave generator 20 may be attached.

That is, by adjusting the area or the geometric pattern of the surface wave generation member 24 depending on the impedance variation of the transmission medium to which the flexible surface wave generation device 20 may be attached, the impedance mismatch may be offset, and the impedance matching may be achieved by differently depositing magnetic field patterns deposited on the surface wave generation member 24, as well as by changing the thickness or the area of each dielectric material 21, 22, and the surface wave generation member 24, or it may be possible to perform impedance matching between the flexible surface wave generation device 20 and a transmission medium by arranging a plurality of surface wave generation members 24 and the like, so it should be noted that the present disclosure may be not limited to the contents presented in the exemplary embodiments of the present disclosure, but may be variously configured as necessary.

Subsequently, referring to FIG. 5, FIG. 5 is a graph showing the results of respectively measuring the variation of the S-parameter depending on frequency about a conventional surface wave generation member (Case 0) and the surface wave generation member (Case 1, Case 2) shown in FIG. 4.

As shown in FIG. 5, compared to the conventional flat surface wave generator (case 0), the surface wave generator (case 1, case 2) according to an exemplary embodiment of the present disclosure shows relatively good S-parameter values around 2.5 GHz, and therefore, it may be possible to design a surface wave generator applicable to the ISM band by changing the unit pattern of the surface wave generation member 24.

However, as shown in FIG. 5 there may be a limitation on improving communication performance and additional performance improvement may be required to actually implement a surface wave generator applicable the ISM band since the value of the S-parameter S11 does not appear equal to or greater than −10 only by changing the unit pattern of the surface wave generation member 24.

Therefore, in the present disclosure as described later, the limitation of changing the unit pattern may be overcome by changing LC component of the radiator body in a form of forming a slit in the radiator body, and the performance similar to a conventional flat surface wave generator may be obtained by implementing a surface wave generator with S11 of −15 or more.

More specifically, referring to FIG. 6, FIG. 6 is a graph showing the results of respectively measuring the variation of the S-parameter depending on frequency by forming a slit in a radiator body of a surface wave generator.

In the results shown in FIG. 6, the measured results for the case of applying the unit slot of Case 2 shown in FIG. 4 as a surface wave generation member (case 2), the case of applying a radiator body formed by inserting 14 slits with 0.2 mm into the existing radiator body along with the unit slot of Case 2 shown in FIG. 4 (case 2+radiator change 1), and the case of applying a radiator body formed by inserting 2 slits with 1 mm into the existing radiator body along with the unit slot of Case 2 shown in FIG. 4 (case 2+radiator change 2) may be compared respectively.

That is, in general, the radiator body of a flat surface wave generator plays the role of forming an electromagnetic field (EM field), and there may be no particular correlation between the change in the size or the shape of the radiator body and the performance of a surface wave generator in a flat surface wave generator.

However, when the thickness of a dielectric material becomes thin, the gap between a radiator body and a surface wave generator becomes narrower as the thickness of a dielectric material becomes thinner, thereby a certain level of capacitor component appears between the surface wave generator and the radiator body and in this case, the shape or the size of the radiator body may affect the performance variation of the surface wave generator.

Therefore, as shown in FIG. 6, it may be seen that it may be possible to improve communication performance through the changes of the radiator body (radiator change 1, 2) in a state where a configuration of a surface wave generation member may be fixed to case 2 shown in FIG. 4.

That is, in the results shown in FIG. 6, it may be seen that the radiator change 2 with a maximum of −25 dB has a performance approximately similar to a conventional flat surface wave generator, and the change of center frequency of a surface wave generator may be fine-tuned by adjusting the size of the overall GND.

More specifically, referring to FIG. 7, as described above, FIG. 7 is a graph showing the results of respectively measuring the variation of the S-parameter depending on a configuration variation of a slit formed in a radiator body of a surface wave generator.

From the results shown in FIG. 7, it may be seen that S11 appears equal to or greater than −10 dB by forming a slit in a radiator body for the same configuration of a surface wave generation member.

Furthermore, as shown in FIG. 7, it may be seen that when the number of slits is small and the interval is large, the center frequency moves to the 2.5 GHz band, and when the number of slits is large and the interval is narrower the center frequency moves to the 2.2 GHz band.

Therefore, from the results described above, it may be seen that the desired frequency band may be selected and designed according to the number of slits and the interval between the slits formed in a radiator body.

As mentioned above, according to the present disclosure, performance deterioration occurs when a dielectric material may be thinned in order to have a conventional flat surface wave generator bendable, and to overcome this, S11 up to −10 dB may be obtained by changing and designing the surface wave generation member according to the inverse proportion to the wavelength of the ISM band, and the performance of S11 may be further improved by adjusting the number of slits and the interval of slits and by adding slits to a radiator body of a surface wave generator.

Subsequently, referring to FIGS. 8 and 9, FIGS. 8 and 9 are graphs showing the results of measuring and comparing the transmission speed in a flat and a curved zone respectively, for the flexible surface wave generator 20 according to an exemplary embodiment of the present disclosure and a conventional surface wave generator 10, and FIG. 8 shows the results of measuring the transmission speed in a flat zone and FIG. 9 shows the results of measuring the transmission speed in a curved zone, respectively.

Here, in FIGS. 8 and 9, the vertical axis of the graph represents the transmission speed, and the horizontal axis represents the distance in meters (m) between the two points where communication is performed.

As shown in FIGS. 8 and 9, both the conventional flat surface wave generator 10 and the flexible surface wave generator 20 according to an exemplary embodiment of this disclosure show that the transmission speed decreases as the communication distance increases.

However, as shown in FIG. 9, it may be seen that the flexible surface wave generator 20 according to an exemplary embodiment of the present disclosure performs more efficient surface communication since the transmission speed does not decrease rapidly as the communication distance increases by being closely attached to a transmission medium having curvature whereas in a conventional flat surface wave generator the transmission speed decreases rapidly as the communication distance increases by not being closely attached to a transmission medium having curvature.

As shown in FIG. 8, in the case of the flat zone, there is a difference in communication speed at the same distance between the conventional flat surface wave generator 10 and the flexible surface wave generator 20 according to an exemplary embodiment of the present disclosure, but as shown in FIG. 9, in the case of the curved zone, the flexible surface wave generator 20 according to an exemplary embodiment of the present disclosure does not have a significant decrease in transmission speed depending on a distance while the conventional flat surface wave generator 10 has a sharp decrease in transmission speed even in a relatively short distance, so it may be seen that the flexible surface wave generator 20 according to an exemplary embodiment of this disclosure is sufficiently applicable for surface wave communication in a curved structure where the conventional flat surface wave generator 10 is difficult to be applied.

Next, referring to FIGS. 10 and 11, FIG. 10 is a conceptual diagram schematically showing an exemplary configuration in which a flexible surface wave generator 20 according to an exemplary embodiment of the present disclosure is applied to a curved surface having different diameters and transmits a surface wave signal, and FIG. 11 is a graph showing the results of measuring and comparing the change of communication performance depending on the degree of bending for each case shown in FIG. 10.

More specifically, FIGS. 10 and 11 show the results of measuring and comparing communication performance depending on a bending level in each case where the flexible surface wave generator 20 according to an exemplary embodiment of the present disclosure is attached to a cylindrical medium having a diameter of 60 mm, a cylindrical medium having a diameter of 90 mm, and a cylindrical medium having a diameter of 150 mm, respectively.

Also, in FIG. 11, the vertical axis of the graph represents the transmission rate and the horizontal axis represents the distance in meters (m) between the two points where communication is performed in each case.

As shown in FIGS. 10 and 11, it may be seen that the flexible surface wave generator 20 according to an exemplary embodiment of the present disclosure has little change in communication performance depending on the diameter or the curvature of an attached surface (a transmission medium or a medium), that is, depending on the degree (bending strength) to which the surface wave generation member 24 bends according to a shape of the curved surface.

From the above results, it may be seen that the flexible surface wave generator 20 according to an exemplary embodiment of the present disclosure may smoothly perform surface wave communication regardless of the curvature degree of the transmission medium or the bending degree of the flexible surface wave generator 20, provided that the surface wave generation member 24 is fully attached to the curved surface using a ductile material.

Therefore, the flexible surface wave generator 20 according to an exemplary embodiment of the present disclosure has the advantage of being applicable to various cylindrical pipes, curved surfaces, and the like regardless of the diameter or the curvature of the attached surface.

As described above, the flexible surface wave generator 20 according to an exemplary embodiment of the present disclosure may be implemented, that is, referring to FIGS. 12 and 13, FIGS. 12 and 13 are conceptual diagrams schematically showing an exemplary configuration in which surface wave signals may be transmitted through a curved surface using a flexible surface wave generator 20 according to an exemplary embodiment of the present disclosure.

As shown in FIG. 12, the flexible surface wave generator according to an exemplary embodiment of this disclosure may transmit surface wave signals in the same principle as a conventional flat surface wave generator.

Furthermore, as shown in FIG. 13, the flexible surface wave generator 20 according to an exemplary embodiment of the present disclosure may transmit surface wave signals not only through the same structure but also through a structure connected to each other.

In addition, referring to FIG. 14, FIG. 14 is a view showing that surface wave communication is performed after installing the flexible surface wave generator 20 according to an exemplary embodiment of the present disclosure in a pipeline of an actual ship.

As shown in FIG. 14, the flexible surface wave generator according to an exemplary embodiment of the present disclosure may be attached to a metal pipe and the like, for example, in a guestroom or cabin of a ship having a metal exterior and a non-metallic interior in order to perform surface wave communication with other guestrooms or cabins, but it should be noted that the present disclosure is not necessarily limited to such cases and may be configured to be attached to various cylindrical pipes having different shapes or curvatures in order to perform surface wave communication, or may be configured to be installed in pairs in order to play a role as transmitter and receiver, and so on, as required.

Therefore, according to the present disclosure, by manufacturing and applying a flexible surface wave generator 20 according to an exemplary embodiment of the present disclosure considering curvature and impedance of a transmission medium to be applied, it is possible to easily establish a wireless communication system in an environment, where it is difficult to attach a conventional surface wave generator, with numerous pipes installed in an engine room or the top of the cabin of a ship, and thereby, efficient wireless communication may be achieved inside the ship without installing separate communication equipment.

Here, in exemplary embodiments of this disclosure described above, more details of specific configurations or operation principles of a surface wave generator may be obvious to those skilled in the art by referring to the contents of the surface wave generator or surface wave communication systems and methods of the related art, so it should be noted that in the present disclosure, detailed descriptions may be omitted for contents that may be obvious to those skilled in the art from the contents of the related art as described above, or that may be easily understood and practiced by those skilled in the art by referring to literature in the related art in order to simplify the description.

Therefore, a flexible surface wave generator applicable to a curved surface according to an exemplary embodiment of the present disclosure and system and method for surface wave communication using the same may be realized as described above, and thereby, it is possible to more easily establish a wireless communication system using surface wave communication even in an environment where a conventional flat surface wave generator is difficult to be applied since signals may be relatively and smoothly transmitted when being tightly attached to the surface of a metal medium having curvature such as a cylindrical pipe installed inside a ship.

Through the exemplary embodiments of the present disclosure as described above, a flexible surface wave generator applicable to a curved surface and system and method for surface wave communication using the same have been described in detail, but the present disclosure is not limited to the contents described in the above-described embodiments, and it is therefore natural that the present disclosure may be modified, changed, combined, and substituted in various ways according to design needs and various other factors by those skilled in the art in the technical field to which the present disclosure pertains.

What is claimed is:

1. A flexible surface wave generator, wherein surface wave communication enables wireless communication even in an environment where a conventional flat surface wave generator is difficult to be applied since surface wave communication is possible by being tightly attached to even a curved surface or a structure having curvature other than a flat surface, the flexible surface wave generator comprising:
    a first dielectric material famed with a predetermined size and thickness using a flexible material;
    a second dielectric material that is formed with a predetermined size and thickness using a flexible material, and is placed below the first dielectric material;
    a radiator body that is formed with a predetermined size and thickness using a flexible material, that is placed between the first dielectric material and the second dielectric material, and that radiates an electromagnetic field when an external signal is received; and
    a surface wave generator member that is formed not only with a predetermined size and thickness using a flexible material but also with a predetermined pattern in order to transmit a surface wave signal of a predetermined frequency from the electromagnetic field generated by the radiator body and is placed below the second dielectric material.

2. The flexible surface wave generator of claim 1, wherein the first dielectric material and the second dielectric material are formed in being bendable using a FPC (flexible printed circuit) material.

3. The flexible surface wave generator of claim 1, wherein the radiator body and the surface wave generation member are formed in being bendable using a copper, gold or silver material.

4. The flexible surface wave generator of claim 1, wherein the radiator body and the surface wave generation member are formed in using a flexible dielectric material with a predetermined permittivity.

5. The flexible surface wave generator of claim 1, wherein the surface wave generation member comprises a slot where a unit slot on which a magnetic material with a geometric pattern of a predetermined shape is deposited is periodically arranged in order to generate a surface wave through the occurrence of resonance in a predetermined frequency band including the ISM (Industrial Scientific Medical) band.

6. The flexible surface wave generator of claim 1, wherein the radiator body comprises slits formed with predetermined numbers and intervals.

7. A surface wave communication system, comprising a flexible surface wave generator written in claim 1.

8. A surface wave communication method using a flexible surface wave generator claimed in claim 1, the surface wave communication method comprising:
    an installation step that performs a process of installing a surface wave generator at a predetermined location for surface wave communications; and
    a communication step that performs a process of sending and receiving a surface wave signal using each surface wave generator installed at the installation step.

* * * * *